United States Patent [19]

Chauhan

[11] Patent Number: 5,538,217
[45] Date of Patent: Jul. 23, 1996

[54] RING-CAKE PREPARATION SYSTEM

[76] Inventor: Patrick N. Chauhan, 179347 Dumfries Cir., Olney, Md. 20832

[21] Appl. No.: 368,972

[22] Filed: Jan. 5, 1995

[51] Int. Cl.⁶ .................................................. B22C 9/24
[52] U.S. Cl. .......................... 249/57; 249/134; 249/135; 249/136; 249/142; 249/144; 249/DIG. 1
[58] Field of Search ................ 249/117, DIG. 1, 249/57, 136, 142, 144, 134, 135

[56] References Cited

U.S. PATENT DOCUMENTS

| D. 249,112 | 8/1978 | Garson et al. | D7/43 |
|---|---|---|---|
| D. 265,708 | 8/1982 | O'Dell | D7/43 |
| D. 274,781 | 7/1984 | Baker et al. | D7/359 |
| 572,509 | 12/1896 | Wilson | 249/144 |
| 692,919 | 2/1902 | Schaumloeffel | 249/DIG. 1 |
| 1,505,999 | 8/1924 | Gereke | 249/DIG. 1 |
| 1,727,257 | 9/1929 | Stratton et al. | 249/DIG. 1 |
| 2,039,374 | 5/1936 | Young | 249/117 |
| 3,262,668 | 7/1966 | Luker | 249/DIG. 1 |
| 3,473,489 | 10/1969 | Sargent | 249/DIG. 1 |
| 4,013,259 | 3/1977 | Tryon | 249/57 |
| 4,395,015 | 7/1983 | Rardon | 249/DIG. 1 |
| 4,653,392 | 3/1987 | Gerber | 249/142 |
| 5,226,352 | 7/1993 | Savage | 249/144 |

*Primary Examiner*—Jan H. Silbaugh
*Assistant Examiner*—Vi Duong Dang

[57] ABSTRACT

A ring-cake preparation system is adapted for use in association with a ring-cake and a ring-cake container. The ring cake container is formed in a cylindrical configuration. A plate with a post is positioned within the cake container. The apparatus includes at least one disc formed in a planar circular configuration with a circular aperture at its approximate center point. The diameter of each circular aperture measures between about eighteen and twenty percent of the diameter of each disc. Each circular aperture is adapted to permit the passage of the post of a ring cake container. At least one rim is formed in a cylindrical configuration and is positioned around the periphery of each disc. The rim is positioned in a perpendicular orientation with respect to the plane of the disc. The width of the rim measures between eight and twelve percent of the diameter of the disc. The disc intersects the rim at its approximate center point. The apparatus is adapted to be positioned around the top of a ring-cake container with the aperture positioned around the post of the device. A user inverts the container to remove the cake.

1 Claim, 4 Drawing Sheets

RING-CAKE PREPARATION SYSTEM

BACKGROUND OF THE INVENTION

1. Field of the Invention

The present invention relates to a ring-cake preparation system and more particularly pertains to removing ring-cakes from cooking containers with the specially designed disc of apparatus.

2. Description of the Prior Art

The use of cake molds and pans is known in the prior art. More specifically, cake molds and pans heretofore devised and utilized for the purpose of cooking various types of cakes are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. Des. 249,112 to Garson et al. a cake mold.

U.S. Pat. No. Des. 265,708 to O'Dell discloses a cake pan.

U.S. Pat. No. 4,395,015 to Reardon discloses a cake mold.

U.S. Pat. No. 3,473,489 to Sargent discloses a cake pan and method of baking a layer cake.

Lastly, U.S. Pat. No. Des. 274,781 to Baker et al. discloses a cake pan.

In this respect, the ring-cake preparation system according to the present invention substantially departs from the conventional concepts and designs of the prior art, and in doing so provides an apparatus primarily developed for the purpose of removing ring-cakes from cooking containers with the specially designed disc of apparatus.

Therefore, it can be appreciated that there exists a continuing need for a new and improved ring-cake preparation system which can be used for removing ring-cakes from cooking containers with the specially designed disc of apparatus. In this regard, the present invention substantially fulfills this need.

SUMMARY OF THE INVENTION

In view of the foregoing disadvantages inherent in the known types of cake molds and pans now present in the prior art, the present invention provides an improved ring-cake preparation system. As such, the general purpose of the present invention, which will be described subsequently in greater detail, is to provide a new and improved ring-cake preparation system and method which has all the advantages of the prior art and none of the disadvantages.

To attain this, the present invention essentially comprises a new and improved ring-cake preparation system comprising, in combination: a ring-cake container formed in a hollow generally cylindrical configuration, the container having a floor, a cylindrical side wall and an open top, the diameter of the floor being slightly smaller that the diameter of the open top with a gradually increasing diameter therebetween; a post and associated base, the post being formed in a hollow generally cylindrical configuration with a lower end and an open upper end, a base being formed in a planar generally circular configuration with an upper surface and a lower surface, the post being positioned vertically and having its lower end affixed to the approximate center point of the upper surface of the base, the lower end of the post having a larger diameter than the upper end of the post with a gradually decreasing diameter therebetween, the base being sized to fit within the ring-cake container of the apparatus, the post positioned centrally within the container in the operative orientation; a ring-cake adapted to be cooked within the container of the apparatus, the ingredients of the cake being placed around the post of the container prior to cooking, during cooking the cake rising and conforming to the cylindrical shape of the container and periphery of the cylindrical post, the ring-cake adapted to be removed by inverting the cake container; first and second discs formed in a planar generally circular configuration, each disc having a circular aperture at its approximate center point, the apertures having a diameter slightly larger than the upper end of the post of the apparatus, a rim being affixed around the periphery of each disc, each rim having a linear region positioned in a generally perpendicular orientation to the plane of the disc, each rim having a flange region formed in a generally U-shaped configuration, the U-shaped flange having two angled end segments and a horizontal segment therebetween, one end of each angled segment being formed contiguously with the periphery of the disc, the opposite end of each angled segment having a free end, the horizontal segment therebetween being positioned in a parallel plane with respect to the disc, each disc adapted to fit around the top and floor of the cake container, the circular aperture in the center of the discs adapted to permit extension of the post therethrough, in the operative orientation the first disc being positioned on a flat surface under the floor of the cake container, the second disc being positioned around the top of the cake container, the cake being inverted onto the first disc for removal so that the post extends through the circular aperture without touching the surface therebelow, in this manner a cake can be easily removed and transported without risk of damage caused by the post hitting a recipient surface.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ring-cake preparation system which has all of the advantages of the prior art cake molds and pans and none of the disadvantages.

It is another object of the present invention to provide a new and improved ring-cake preparation system which may be easily and efficiently manufactured and marketed.

It is further object of the present invention to provide a new and improved ring-cake preparation system which is of durable and reliable constructions.

An even further object of the present invention is to provide a new and improved ring-cake preparation system which is susceptible of a low cost of manufacture with regard to both materials and labor, and which accordingly is then susceptible of low prices of sale to the consuming public, thereby making such ring-cake preparation system economically available to the buying public.

Still yet another object of the present invention is to provide a new and improved ring-cake preparation system which provides in the apparatuses and methods of the prior art some of the advantages thereof, while simultaneously overcoming some of the disadvantages normally associated therewith.

Still another object of the present invention is to removing ring-cakes from cooking containers with the specially designed disc of apparatus.

Lastly, it is an object of the present invention to provide a new and improved ring-cake preparation system adapted for use in association with a ring-cake and a ring-cake container of the type being formed in a generally cylindrical configuration with a post extending upwardly therefrom, the apparatus comprising: at least one disc formed in a planar generally circular configuration with a circular aperture at its approximate center point, the diameter of each circular aperture measuring between about eighteen and twenty percent of the diameter of each disc, each circular aperture adapted to permit the passage of the post of a ring cake container in the operative orientation; and at least one rim formed in a generally cylindrical configuration and positioned around the periphery of each disc, the rim being positioned in a generally perpendicular orientation with respect to the plane of the disc, the width of the rim measuring between eight and twelve percent of the diameter of the disc, the disc intersecting the rim at its approximate center point, the apparatus adapted to be positioned around the top of a ring-cake container with the aperture in the disc being positioned around the post of the device, the user inverting the container to remove the cake in the operative orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
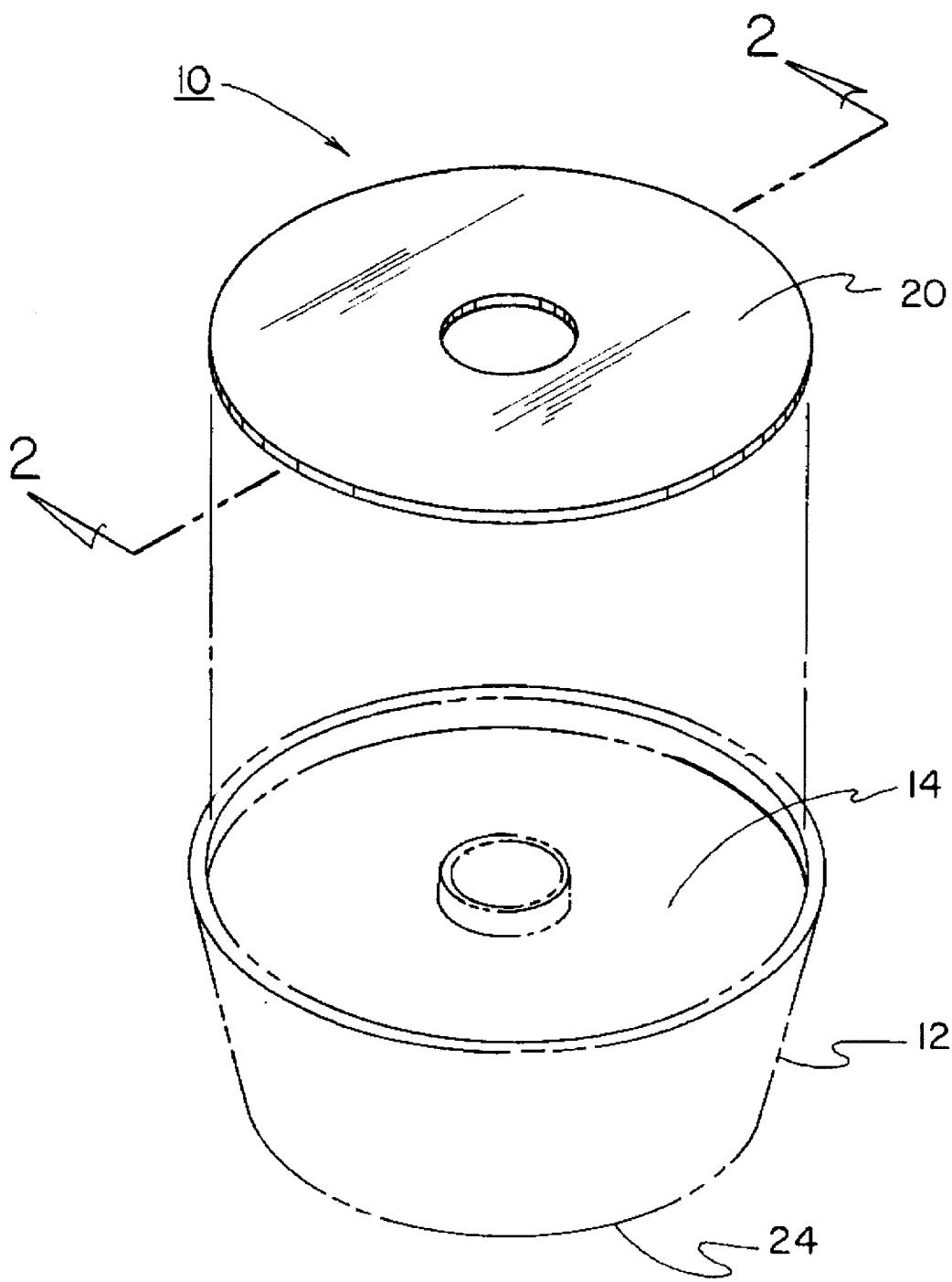
FIG. 1 is an alternative and embodiment of the apparatus illustrating a disc without an associated rim.
Figure 2:
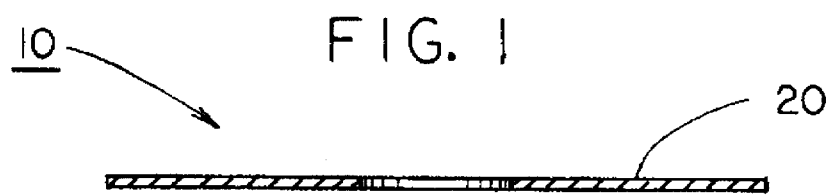
FIG. 2 is a cross sectional view of the rim shown in FIG. 1 taken along 2—2 of FIG. 1.

With reference now to the drawings, and in particular to FIG. 1 thereof, the preferred embodiment of the new and improved ring-cake preparation system embodying the principles and concepts of the present invention and generally designated by the reference numeral 10 will be described.

Figures 4, 5:
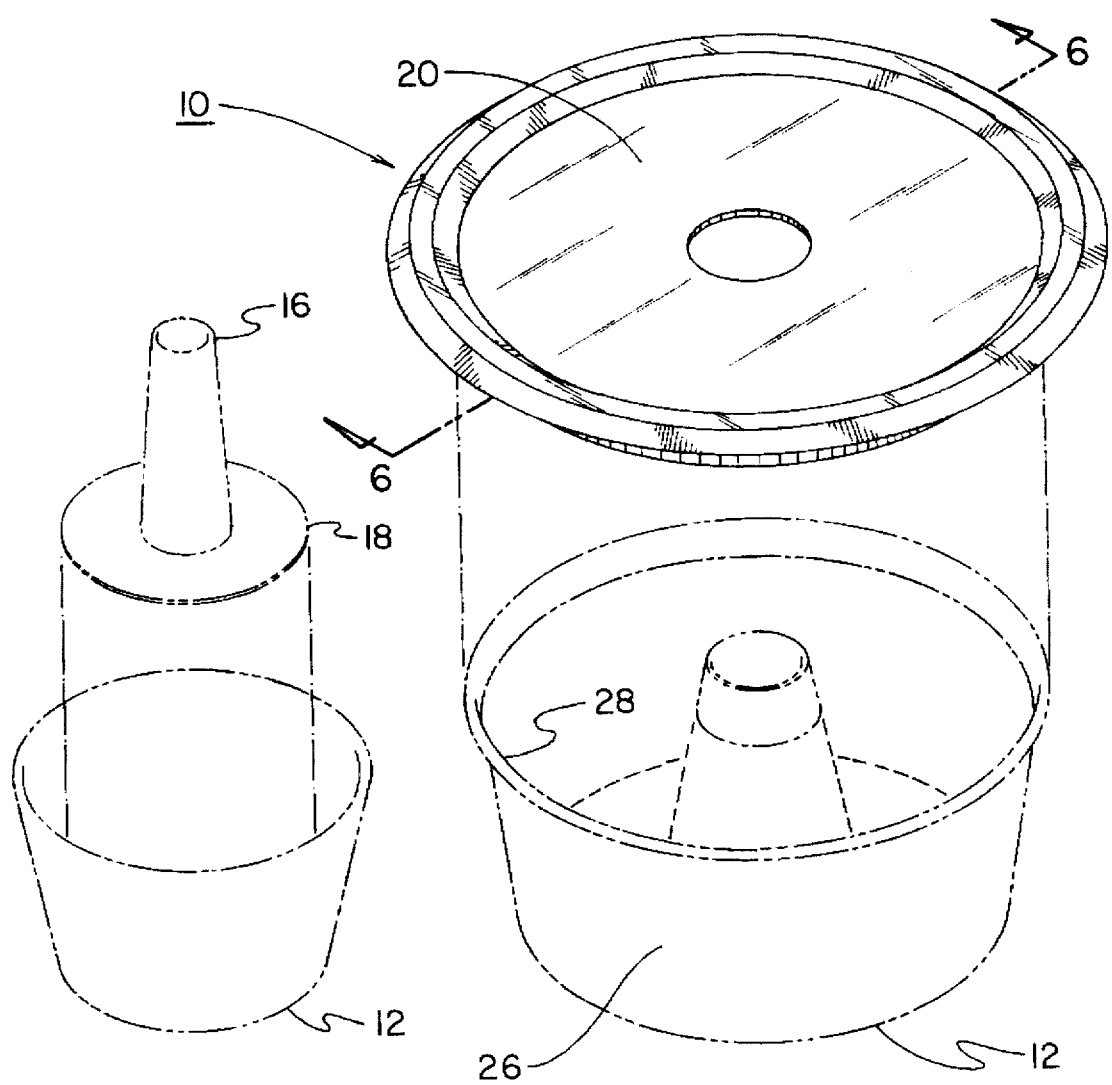
FIG. 4 is a separated perspective illustration of the primary embodiment of the ring-cake container and its associated post and base.
FIG. 5 is a separated perspective illustration of the primary embodiment of the apparatus illustrating the disc with its associated rim.

The present invention, the ring-cake preparation system 10 is comprised of a plurality of components. Such components in their broadest context include a cake container 12, a cake 14, a post 16, a associated base 18, and a disc 20. Note FIG. 4. Such components are individually configured and correlated with respect to each other so as to attain the desired objective.

Figure 3:
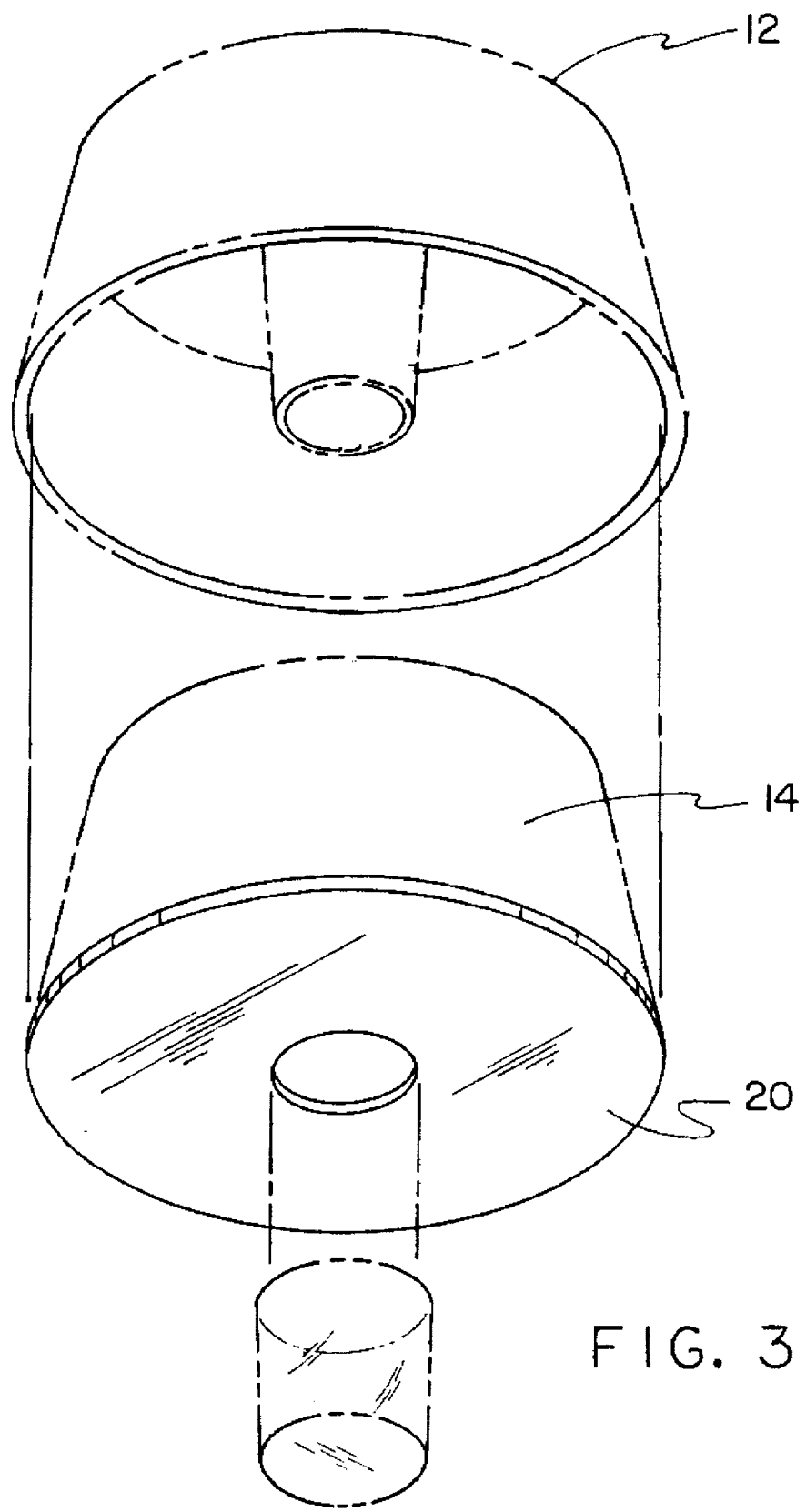
FIG. 3 is an inverted perspective view of the apparatus shown in FIG. 1 illustrating a ring-cake positioned on the rim.

More specifically, the ring-cake container 12 is formed in a hollow generally cylindrical configuration. The container has a floor 24, a cylindrical side wall 26 and an open top 28. Note FIG. 5. The diameter of the floor is slightly smaller that the diameter of the open top with a gradually increasing diameter therebetween. The cake container is fabricated of light weight metal. The metal permits steady conduction of heat to ensure even cooking of the cake in the operative orientation. Note FIGS. 1 and 3.

A post 16 and an associated base 18 are included with the apparatus. The post is formed in a hollow generally cylindrical configuration with a lower end 30 and an open upper end 32. A base 18 is formed in a planar generally circular configuration with an upper surface and a lower surface. The post is positioned vertically and has its lower end 30 affixed to the approximate center point of the upper surface of the base. The lower end 30 of the post has a larger diameter than the upper end 32 of the post with a gradually decreasing diameter therebetween. This configuration permits easy removal of the cake when inverted during the removal process. Note FIG. 3.

Figure 7:
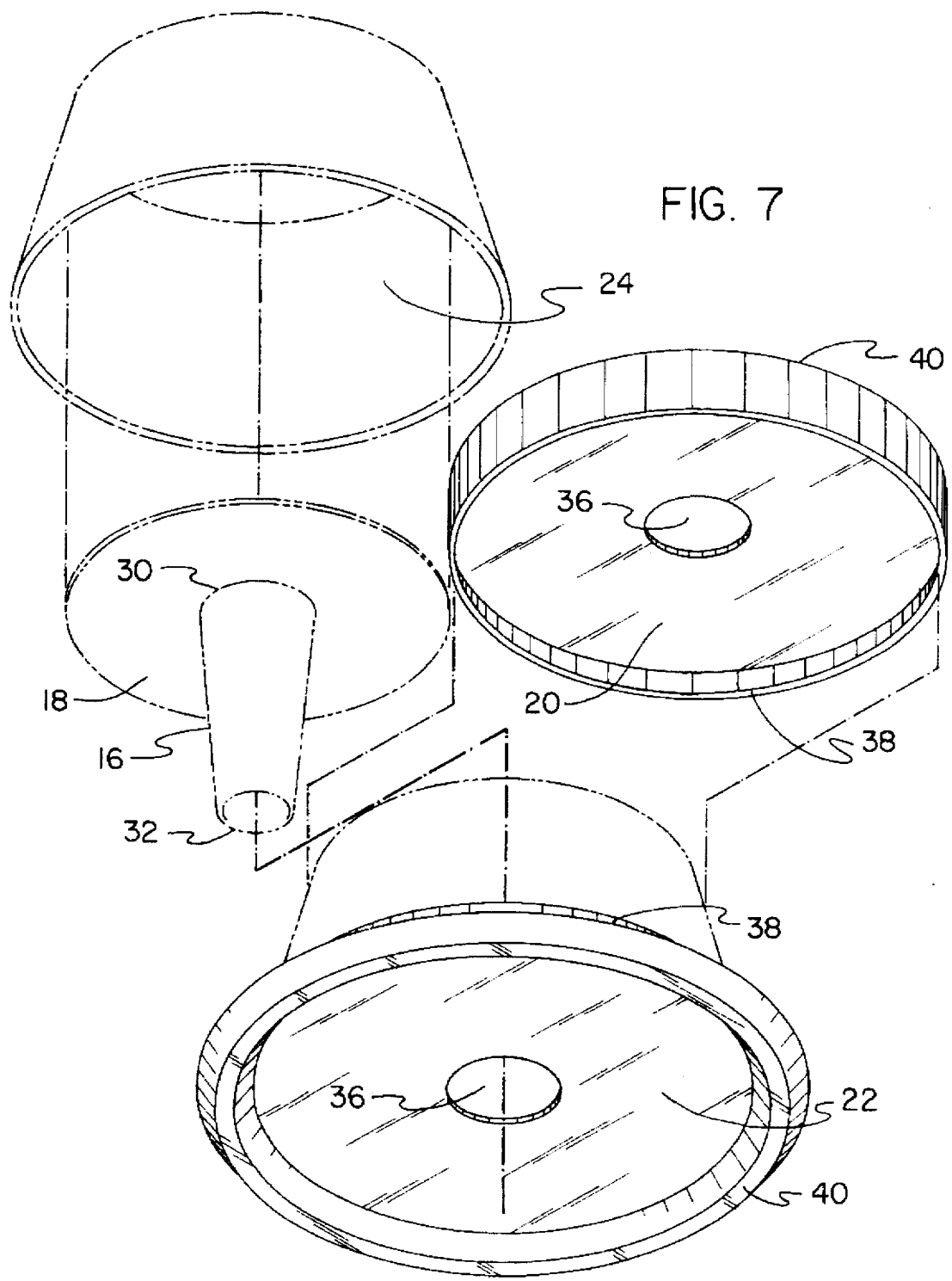
FIG. 7 is a perspective view of the preferred embodiment of the ring-cake preparation system constructed in accordance with the principles of the present invention.

The base is sized to fit within the ring-cake container 12 of the apparatus. In an alternative embodiment of the apparatus the base is fabricated in a plurality of different sizes to accommodate the inner diameter of a plurality of differently size containers. The post is positioned centrally within the container. The post is fabricated of light weight metal to enhance the conduction of heat and ensure even cooking of the cake in the operative orientation. Note FIGS. 4 and 7.

A ring-cake 14 is adapted to be cooked within the container of the apparatus. The ingredients of the cake are placed around the post of the container prior to cooking. During cooking, the cake rises and conforms to the cylindrical shape of the container and periphery of the cylindrical post. The ring-cake is removed by inverting the cake container. Prior to removal a knife is utilized to help separate the post from the cake. This procedure helps to ensure removal of the cake without breaking or splitting. Note FIG. 3.

First 20 and second discs 22 are each formed in a planar generally circular configuration. Each disc is about ten and one-half inches in diameter. The discs may be fabricated of cardboard or a plurality of other materials. Each disc has about a two inch circular aperture 36 at its approximate center point. The apertures have a diameter slightly larger than the upper end of the post of the apparatus. The apertures are sized to fit comfortably around the post of the container. A rim is affixed around the periphery of each disc at the approximate center point of the rim. Each rim has a linear region 38 positioned in a generally perpendicular orientation with respect to the plane of the disc. Note FIG. 5.

Figure 6:
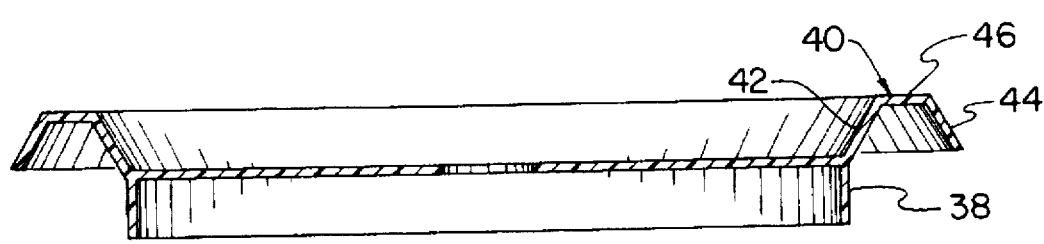
FIG. 6 is a cross sectional view of the disc shown if FIG. 5 taken along line 6—6 of FIG. 5.

Each rim has a flange region 40 formed in a generally U-shaped configuration. The U-shaped flange has two angled end segments 42, 44 and a horizontal segment 46 therebetween. One end of the angled end segments 42 is formed contiguously with the periphery of the disc. The opposite angled end segment 44 has a free end. The horizontal segment 46 therebetween is positioned in a parallel plane with respect to the disc. Each angled end segment is about one half inch in length. The entire rim is about two inches in height. Note FIG. 6.

Each horizontal segment therebetween is about one quarter inch in length. The configuration of the U-shaped segment permits the user to securely position the U-shaped segment on a flat recipient surface in the operative orientation. The angle of each end segment with respect to the horizontal is between sixty and one hundred and twenty degrees. The U-shaped flange also permits easy gripping by the user when lifting and transporting the apparatus. Note FIGS. 5, 6, and 7.

Each disc 20, 22 is adapted to fit around the top and floor of the cake container. The circular aperture in the center of the discs are adapted to permit extension of the post therethrough. In the operative orientation the first disc is positioned on a flat surface under the floor of the cake container. The second disc is then positioned around the top of the cake container. The first disc provides an elevated surface for clearance of the post of the container when removing the cake. The cake is inverted onto the first disc for removal so that the post extends through the circular aperture without touching the surface below it. In this manner a cake is easily removed and transported without risk of damage caused by the post hitting a recipient surface. The cake is easily damaged if the post hits the surface of a recipient surface prior to the cake being gently placed on a plate or disk. Note FIG. 7.

The ring-cake removal system is an implement which can be used to extract a ring cake from its mold while keeping the cake intact and free of cracks or ruptures. It is made of cardboard, plastic or aluminum and shaped in the form of a flat disc with a central aperture. The aperture is slightly larger than the outside diameter of the post in the ring-cake container. The outside diameter of the disc is approximately ten inches.

When the cake is to be removed from the mold, one first uses a knife to gently separate the cake from the post. This is a standard cooking procedure to alleviate sticking. One disc is then placed over the top of the cake and one under the cake. Using the thumb and fingers of both hands, the cake and the disk are inverted onto another disk. It is then a simple matter to remove the post while the cake rests on a disc. The cake is then returned to its upright position using both hands.

The main advantage of this handy implement lies in the avoidance of the alternatives. Despite initial greasing of the post to eliminate sticking, there is usually some adherence to the post. Hence, the cake must be lifted with both hands and elevated while hoping that the post disengages and falls out. If it does not, assistance from a second party is required to push it out. This can result in damage to the cake which makes it unsightly and unappetizing. The disc addresses and eliminates these problems. It can easily be manipulated by one person.

The function of the rim is to prevent initial contact of the post with the table surface. Usually the tip of the post is about level with the surface of the cake. When the post protrudes significantly from the surface of the cake the post will come in contact with the surface of the table before the inverted cake is placed on the table. This step of placing the inverted cake on the table must be done slowly and carefully to determine if the center piece (post and bottom plate) moves upward when the post makes contact with the table. If it does, the cake can be placed on the table and the center piece removed.

If the post does not move upward when the post makes contact with the table the cake should not be placed on the table as the cake will be damaged. Instead, one hand should be advanced well under the disc to support the cake until the other hand places some object (say an inverted mug) under the disc where the hand was to further support the disc and free the center piece. If the center piece does not come loose help must be summoned.

The ring-cake preparation system enables a user to readily and safely place an inverted cake on the table as the rim supports the disc above the table surface. The cake rests on the disc and the protruding post passes through the aperture and does not touch the table.

The flange of the apparatus enables the user to lift the disc with the inverted cake on it prior to placing it upright on the serving plate. When a plate is used the disc (not the cake) has to be moved a little beyond the edge of the table to get the thumbs under it.

How to use the ring-cake preparation system with only one disc:

1. The baked cake is taken out of the ring-cake container while still resting on the post and base. The cake is then placed at the edge of the table or counter.

2. A knife is inserted along side the post and moved all around it to make sure that it does not adhere to the cake at any point along its surface.

3. A disc is then placed on top of the cake with its flange pointing down.

4. The cake is then moved slowly beyond the edge of the table by the index and middle finger placed in the hollow of the post. As the bottom plate passes the edge of the table the thumb of the other hand is placed under the bottom to support it. The fingers are placed lightly in the flange of the disc. When the bottom plate is half-way beyond the edge of the table, the fingers moving the plate are taken out of the post. The free hand is then used to support the plate by placing the thumb under the plate and the fingers in the flange of the disc. The hands should be opposite each other and should hold the cake between the top disc and the bottom plate firmly and securely. Excessive compression by the fingers and the thumbs should be avoided as this could damage the cake.

5. The cake, firmly and securely held, is now lifted up in the upright position to a comfortable level in readiness for inverting. The cake is inverted by rotating both hands forward one hundred eighty degrees and placing it on the table. Forward rotation is a movement away from the person doing it.

6. The bottom plate is now on top. It is separated from the cake by placing the thumb of one hand in the hollow of the post and the fingers on the edge of the bottom plate and gently twisting the disc a little clockwise and counter clockwise. If the disc sticks a little a long flat knife can be used to free it. The post is easily loosened by the twisting. It is much easier to free the bottom plate with a knife when the cake is inverted than when it is upright. In the upright position separating a sticking bottom disc means that the cake has already been lifted once with the hands. Another person is then called to lift the cake again and the chances of damaging the cake are increased as the bottom disc is being freed. In the inverted cake (disc used) the bottom plate is held and lifted while it is being freed. This can be done by one person. Another person who is suddenly called to help may not have washed his or her hands. This is unsanitary if he or she is asked to lift the cake with his hands. This is especially true in a bakery or hotel kitchen. When the bottom plate is free it is lifted and removed.

7. A serving plate is now placed on the bottom of the cake. The fingers are then placed in the flange and the thumbs on the serving plate. The apparatus is then lifted and turned upright by rotating the hands towards the person doing it. The disc is then removed.

Step 4 can be bypassed by placing the cake when taken out of the mold on an object smaller in surface area than the area of the bottom plate. A little of the edge of the bottom plate on opposite sides is then free and above the surface of the table. The thumbs can then by easily placed under the bottom plate. With the fingers in the groove the cake can be lifted up prior to inverting it. The object can be an inverted bowl or soup plate. The cake must sit securely on the object. In a bakery, a table of spaced slats should do fine.

The user may get around step 4 by using two discs. The baked cake, when taken out of the outer part of the mold, should initially be placed on an inverted disc, rim down. The other disc is of course placed on the top of the cake with the flange pointing down. The thumbs go under the flange and the fingers in the upper flange to lift the cake prior to inverting it.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A ring-cake preparation system comprising, in combination:

a ring-cake container formed in a hollow generally cylindrical configuration, the container having a floor, a cylindrical side wall and an open top, the diameter of the floor being slightly smaller than the diameter of the open top with a gradually increasing diameter therebetween;

a post and associated base, the post being formed in a hollow generally cylindrical configuration with a lower end and an open upper end, a base being formed in a planar generally circular configuration with an upper surface and a lower surface, the post being positioned vertically and having its lower end affixed to the approximate center point of the upper surface of the base, the lower end of the post having a larger diameter than the upper end of the post with a gradually decreasing diameter therebetween, the base being sized to fit within the ring-cake container of the apparatus, the post positioned centrally within the container in an operative orientation; and first and second discs formed in a planar generally circular configuration, each disc having a circular aperture at its approximate center point, the apertures having a diameter slightly larger than the upper end of the post of the apparatus, a rim being affixed around the periphery of each disc, each rim having a linear region positioned in a generally perpendicular orientation to the plane of the disc, each rim having a flange region formed in a generally U-shaped configuration, the U-shaped flange having two angled end segments and a horizontal segment therebetween, one end of each angled segment being formed contiguously with the periphery of the disc, the opposite end of each angled segment having a free end, the horizontal segment therebetween being positioned in a parallel plane with respect to the disc, the angle of each end segment with respect to the horizontal being about one hundred and twenty degrees, each disc adapted to fit around the top and floor of the cake container, the circular aperture in the center of the discs adapted to permit extension of the post therethrough, in an operative orientation the first disc being positioned on a flat surface under the floor of the cake container, the second disc being positioned around the top of the cake container, the cake being inverted onto the first disc for removal so that the post extends through the circular aperture without touching said flat surface therebelow, such that a cake can be easily removed and transported without risk of damage caused by the post hitting a recipient surface.

* * * * *